United States Patent
Gormley

(10) Patent No.: US 11,053,887 B2
(45) Date of Patent: Jul. 6, 2021

(54) THRUST REVERSER WITH DISPLACEABLE TRAILING EDGE BODY

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 441 days.

(21) Appl. No.: 16/025,431

(22) Filed: Jul. 2, 2018

(65) Prior Publication Data
US 2020/0003156 A1  Jan. 2, 2020

(51) Int. Cl.
*F02K 1/60* (2006.01)
*F02K 1/76* (2006.01)

(52) U.S. Cl.
CPC ............... *F02K 1/60* (2013.01); *F02K 1/605* (2013.01); *F02K 1/763* (2013.01); *F05D 2260/50* (2013.01)

(58) Field of Classification Search
CPC ... F02K 1/60; F02K 1/605; F02K 1/62; F02K 1/625; F02K 1/70; F02K 1/72
See application file for complete search history.

(56) References Cited

U.S. PATENT DOCUMENTS

| 3,003,312 A * | 10/1961 | Jewell | F02K 1/605 239/265.35 |
| 3,020,712 A | 2/1962 | Dolliver | |
| 3,036,431 A | 5/1962 | Vdolek | |
| 3,581,841 A | 6/1971 | Raynes | |
| 4,410,152 A | 10/1983 | Kennedy et al. | |
| 5,176,340 A | 1/1993 | Lair | |
| 5,853,148 A | 12/1998 | Standish et al. | |
| 6,688,099 B2 * | 2/2004 | Lair | B64D 33/04 60/226.2 |
| 8,002,217 B2 | 8/2011 | Sternberger | |
| 2003/0126856 A1 * | 7/2003 | Lair | F02K 3/06 60/262 |
| 2015/0267640 A1 * | 9/2015 | Gormley | F02K 1/72 239/265.19 |
| 2015/0267642 A1 * | 9/2015 | Gormley | F02K 1/763 239/265.19 |
| 2016/0201604 A1 * | 7/2016 | Gormley | F02K 1/76 415/144 |

FOREIGN PATENT DOCUMENTS

| GB | 2252279 A | 7/1991 | |
| GB | 2252279 | * 8/1992 | ............. F02K 1/605 |

OTHER PUBLICATIONS

EP search report for EP19183367.2 dated Nov. 20, 2019.

* cited by examiner

*Primary Examiner* — Andrew H Nguyen
(74) *Attorney, Agent, or Firm* — Getz Balich LLC

(57) ABSTRACT

An assembly is provided for an aircraft propulsion system. This assembly includes a target-type thrust reverser and a tubular trailing edge body. The target-type thrust reverser includes a plurality of thrust reverser doors. Each of the thrust reverser doors is configured to pivot between a stowed position to a deployed position. The tubular trailing edge body is configured to at least partially form a gas path nozzle for the aircraft propulsion system. The tubular trailing edge body is configured to be displaced when the thrust reverser doors pivot from the stowed position to the deployed position.

20 Claims, 10 Drawing Sheets

THRUST REVERSER WITH DISPLACEABLE TRAILING EDGE BODY

BACKGROUND

1. Technical Field

This disclosure relates generally to an aircraft propulsion system and, more particularly, to a thrust reverser for an aircraft propulsion system.

2. Background Information

FIG. 9 illustrates an aircraft propulsion system 900 with a known target-type thrust reverser 902 in a stowed position. FIG. 10 illustrates the aircraft propulsion system 900 with the target-type thrust reverser 902 in a deployed position. While such known thrust reversers have various benefits, these thrust reversers typically require the thrust reverser doors 904 to be positioned relatively far forward axially and, thus, increase the axial overall length of the propulsion system's nacelle. There is a need in the art for a thrust reverser arrangement enabling a more axially compact nacelle.

SUMMARY OF THE DISCLOSURE

According to an aspect of the present disclosure, an assembly is provided for an aircraft propulsion system. This assembly includes a target-type thrust reverser and a tubular trailing edge body. The target-type thrust reverser includes a plurality of thrust reverser doors. Each of the thrust reverser doors is configured to pivot between a stowed position to a deployed position. The tubular trailing edge body is configured to at least partially form a gas path nozzle for the aircraft propulsion system. The tubular trailing edge body is configured to be displaced when the thrust reverser doors pivot from the stowed position to the deployed position.

According to another aspect of the present disclosure, another assembly is provided for an aircraft propulsion system. This assembly includes a fixed structure, a first thrust reverser door, a second thrust reverser door, a trailing edge body and a linkage. The fixed structure extends axially along and circumferentially about an axial centerline. The first thrust reverser door is pivotally attached to the fixed structure by a first hinge. The second thrust reverser door is pivotally attached to the fixed structure by a second hinge. The trailing edge body is configured to at least partially form a gas path nozzle for the aircraft propulsion system. The trailing edge body is pivotally attached to the second thrust reverser door by a third hinge. The linkage couples the trailing edge body to the first thrust reverser door. The linkage is pivotally attached to the trailing edge body and the first thrust reverser door.

According to still another aspect of the present disclosure, still another assembly is provided for an aircraft propulsion system. This assembly includes a thrust reverser and a tubular trailing edge body. The thrust reverser includes a plurality of thrust reverser doors. Each of the thrust reverser doors is configured to pivot between a stowed position and a deployed position. The tubular trailing edge body is configured to at least partially form a gas path nozzle for the aircraft propulsion system. The tubular trailing edge body is configured to move from a first position to a second position as the thrust reverser doors pivot from the stowed position to the deployed position. A centerline of the tubular trailing edge body is coaxial with an axial centerline of the aircraft propulsion system when the tubular trailing edge body is in the first position. The centerline is non-coaxial with the axial centerline when the tubular trailing edge body is in the second position.

The first thrust reverser door and the second thrust reverser door may be configured to redirect gas flowing out from the aircraft propulsion system.

The trailing edge body may be configured to move relative to the fixed structure as the first blocker door and the second blocker door pivot from a stowed position to a deployed position.

The trailing edge body may be configured as a tubular trailing edge body.

The displacement of the tubular trailing edge body may include at least or only a radial displacement relative to an axial centerline of the aircraft propulsion system.

The displacement of the tubular trailing edge body may include at least or only an axial displacement relative to an axial centerline of the aircraft propulsion system.

The displacement of the tubular trailing edge body may include at least or only a pivotal displacement.

The displacement of the tubular trailing edge body may include a combination of any two or all of the following displacements: a radial displacement relative to an axial centerline of the aircraft propulsion system; an axial displacement relative to the axial centerline; and a pivotal displacement.

The tubular trailing edge body may be configured to completely form a trailing edge of the gas path nozzle.

The tubular trailing edge body may be configured to form a first portion of a trailing edge of the gas path nozzle. A first of the thrust reverser doors may be configured to form a second portion of the trailing edge.

The assembly may also include a fixed structure. Each of the thrust reverser doors may be pivotally attached to the fixed structure by a respective hinge.

The tubular trailing edge body may be pivotally attached to a first of the thrust reverser doors by a hinge. The tubular trailing edge body may be coupled to a second of the thrust reverser doors by a linkage.

The linkage may be configured as a link arm extending between a first link arm end and a second link arm end. The link arm may be pivotally attached to the second of the thrust reverser doors at the first link arm end. The link arm may be pivotally attached to the tubular trailing edge body at the second link arm end.

The tubular trailing edge body may be further coupled to the second of the thrust reverser doors by a second linkage. The linkage and the second linkage may be circumferentially displaced from one another.

The tubular trailing edge body may overlap respective aft portions of the thrust reverser doors when the thrust reverser doors are in the stowed position.

A gas path may extend within the aircraft propulsion system to a trailing edge of the gas path nozzle. Each of the thrust reverser doors may be configured to partially form an outer peripheral boundary of the gas path when in the stowed position. The tubular trailing edge body may be configured to partially form the outer peripheral boundary of the gas path when the thrust reverser doors are in the stowed position.

The thrust reverser doors may be configured to redirect gas flowing out from a core of the aircraft propulsion system.

The assembly may also include a plurality of actuators. Each of the actuators may be configured to pivot a respective one of the thrust reverser doors from the stowed position to the deployed position.

The foregoing features and the operation of the invention will become more apparent in light of the following description and the accompanying drawings.

DETAILED DESCRIPTION

Figure 1:
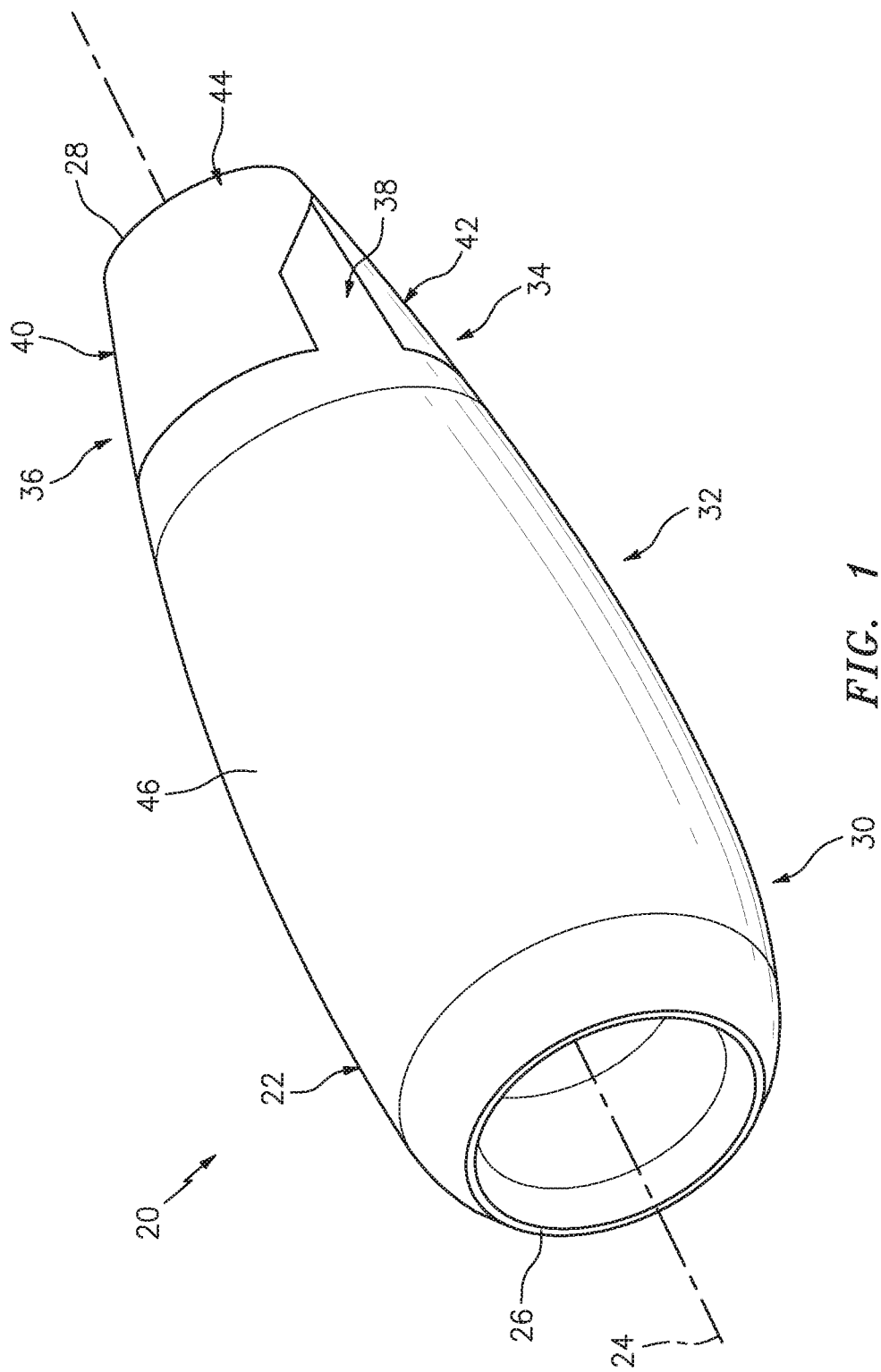
FIG. 1 is a perspective illustration of an aircraft propulsion system, in accordance with various embodiments.

FIG. 1 is a perspective illustration of an aircraft propulsion system 20 for an aircraft such as, but not limited to, a commercial airliner or cargo plane. This propulsion system 20 includes a nacelle 22 and a gas turbine engine. The gas turbine engine may be configured as a turbojet gas turbine engine; however, the present disclosure is not limited to such an exemplary gas turbine engine configuration.

The nacelle 22 is configured to house and provide an aerodynamic cover for the gas turbine engine. The nacelle 22 extends along an axial centerline 24 of the aircraft propulsion system 20 between a nacelle upstream, forward end 26 and a nacelle downstream, aft end 28.

The nacelle 22 of FIG. 1 includes a nacelle inlet structure 30, one or more cowls 32 (one such cowl visible in FIG. 1) and a nacelle aft structure 34, which is configured as part of or includes a thrust reverser 36 such as, but not limited to, a target-type thrust reverser. The terms "target-type thrust reverser" and "clamshell-type thrust reverser" herein may both describe a thrust reverser with one or more (e.g., a pair of) outwardly pivoting doors. However, whereas the doors of a clamshell-type thrust reverser only redirect an outer cold gas stream (e.g., a bypass gas stream) and not an inner hot gas stream (e.g., a core gas stream), the doors of a target-type thrust reverser may redirect at least a hot gas stream and, in some embodiments, also a cold gas stream where the gas turbine engine is a turbofan gas turbine engine, for example.

The inlet structure 30 is disposed at the nacelle forward end 26. The inlet structure 30 is configured to direct a stream of air through an inlet opening at the nacelle forward end 26 and into a forward-most stage (e.g., a low-pressure compressor (LPC) stage or a fan stage) of the gas turbine engine.

The cowls 32 are disposed axially between the inlet structure 30 and the aft structure 34. The cowls 32 are configured to provide an aerodynamic covering for a casing of the gas turbine engine.

Figure 2:
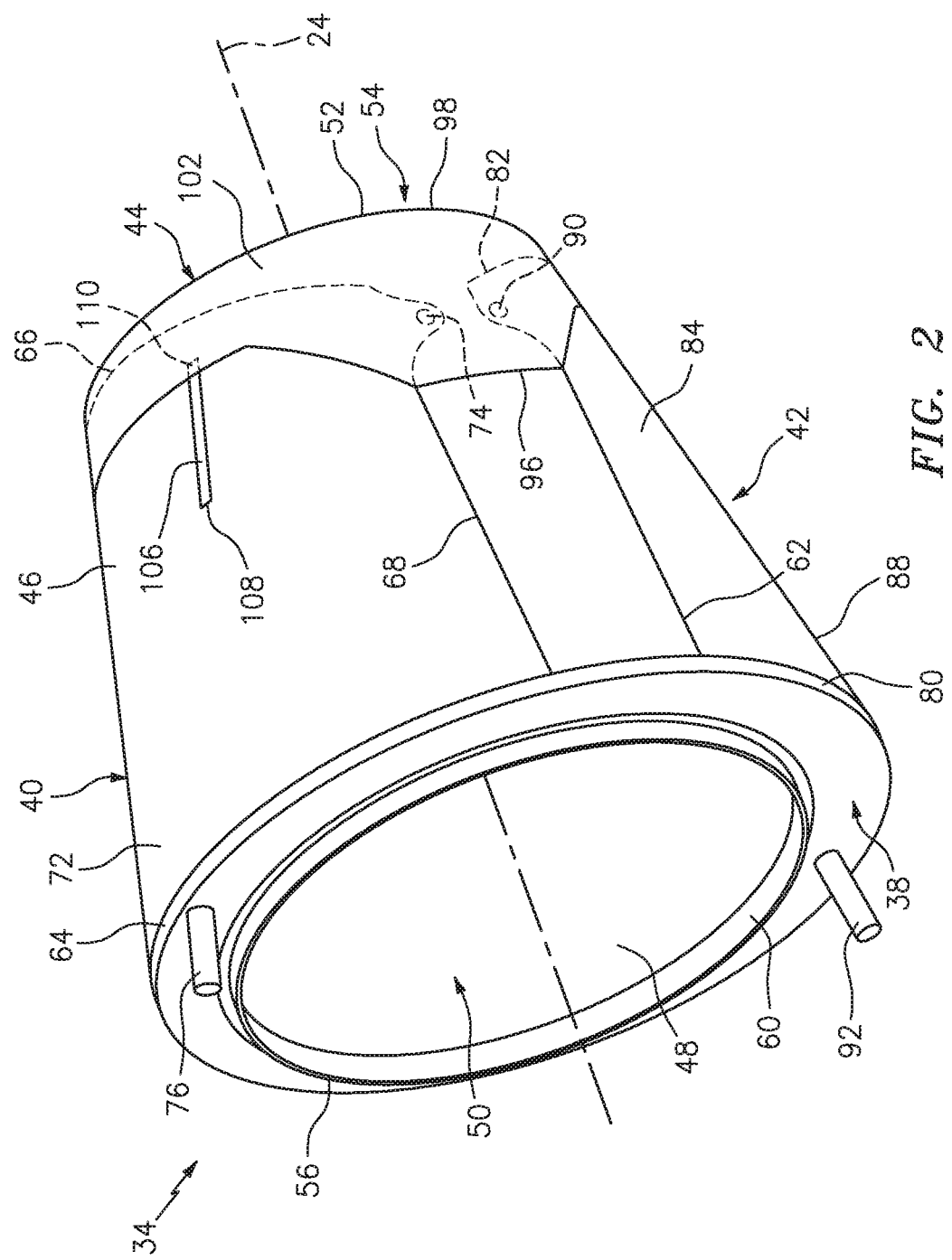
FIG. 2 is a perspective illustration of an aft structure of the aircraft propulsion system with stowed thrust reverser doors, in accordance with various embodiments.

The aft structure 34 includes a fixed structure 38, one or more (e.g., an opposing pair of) thrust reverser doors 40 and 42 and a (e.g., tubular) trailing edge body 44. Referring to FIG. 2, the aft structure 34 and its components are configured to form an aft portion of an outer aerodynamic flow surface 46 of the nacelle 22; see also FIG. 1. The aft structure 34 and its components are configured to form an aft portion of an inner aerodynamic flow surface 48. This aft portion of the inner aerodynamic flow surface 48 forms an outer peripheral boundary of an aft-most portion of a gas path 50 within the aircraft propulsion system 20; e.g., a core gas path. This aft-most portion of the gas path 50 may receive a mixed gas flow (e.g., a mix of a core gas and/or bypass air) from an upstream portion (or portions) of the gas turbine engine; e.g., from a bypass duct and/or a low-pressure turbine (LPT) stage in a core of the gas turbine engine. The aft-most portion of the gas path 50 extends axially along the axial centerline 24 within the aircraft propulsion system 20 to an annular trailing edge 52 of a gas path nozzle 54 (e.g., a core nozzle), at which the gas path 50 meets an exterior environment surrounding the aircraft propulsion system 20.

Figure 3:
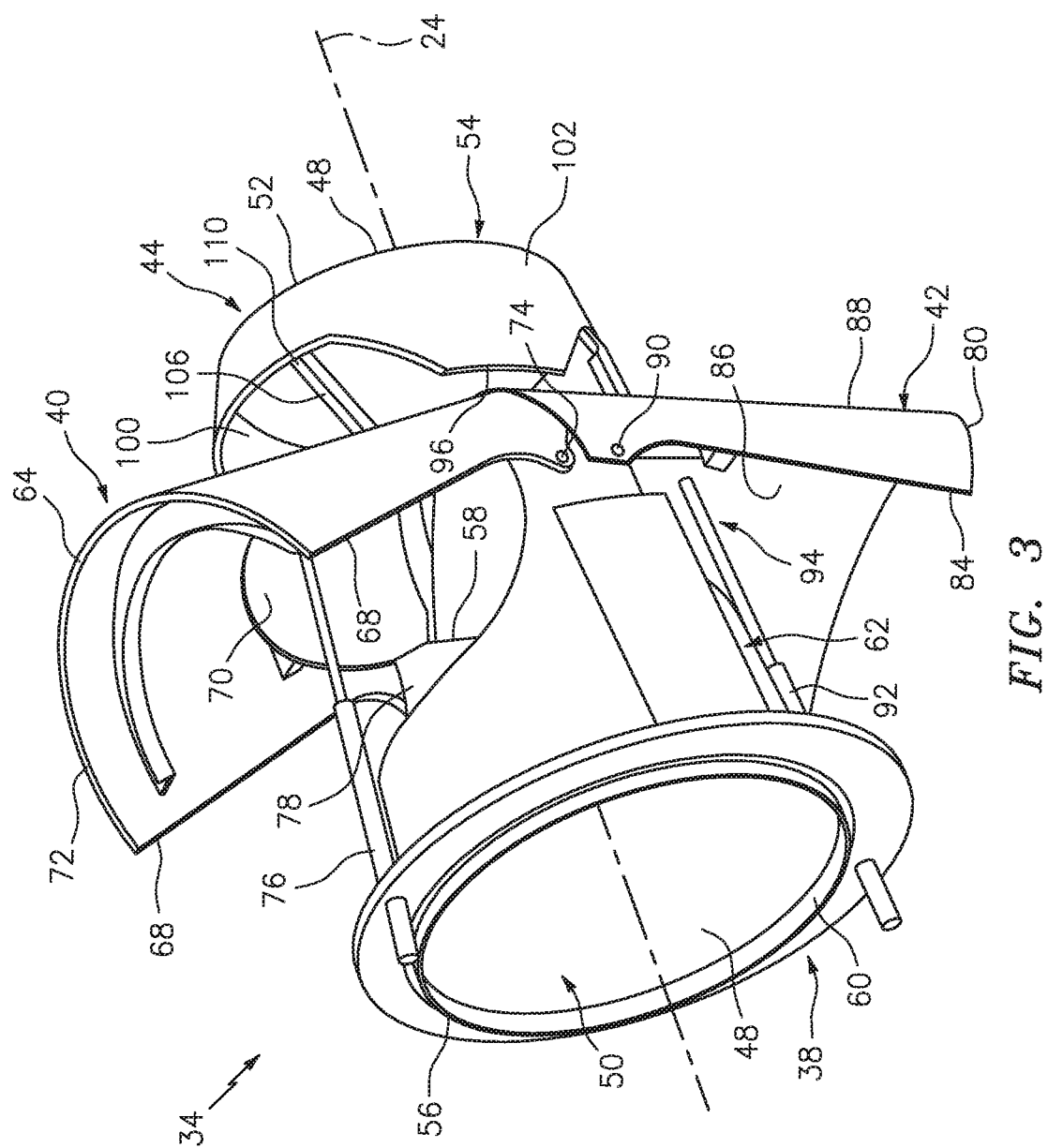
FIG. 3 is a perspective illustration of the aft structure of the aircraft propulsion system with deployed thrust reverser doors, in accordance with various embodiments.

Referring to FIGS. 2 and 3, the fixed structure 38 is configured with a tubular body. The fixed structure 38 of FIGS. 2 and 3, for example, extends circumferentially (e.g., completely) about the centerline 24. The fixed structure 38 extends axially along the centerline 24 between a fixed structure forward end 56 and a fixed structure aft end 58. The fixed structure 38 of FIGS. 2 and 3 is configured with a (e.g., tubular) fixed structure inner panel 60 and one or more fixed structure outer panels 62 (one visible in FIGS. 2 and 3). The inner panel 60 partially forms a respective portion of the inner aerodynamic flow surface 48. The outer panels 62 may be (e.g., diametrically) opposed from one another, and partially form the outer aerodynamic flow surface 46. Each outer panel 62 may have a generally rectangular or otherwise polygonal perimeter shape; however, the present disclosure is not limited to such an exemplary fixed structure configuration.

Referring still to FIGS. 2 and 3 (see also FIGS. 4 and 5), the (e.g., upper) thrust reverser door 40 may be configured as a generally arcuate (e.g., conical) body. The thrust reverser door 40 of FIGS. 2 and 3, for example, extends axially along the centerline 24 between a first (e.g., forward) door end 64 and a second (e.g., aft) door end 66. The thrust reverser door 40 extends circumferentially (e.g., between 150-180 degrees) about the centerline 24 between opposing door sides 68. The thrust reverser door 40 includes and extends radially between an inner arcuate (e.g., conical) panel 70 and an outer arcuate (e.g., conical) panel 72. The inner arcuate panel 70 is configured to define a respective portion of the inner aerodynamic surface 48 and, thus, a respective outer peripheral boundary portion of the gas path 50 when the door 40 is in its stowed position. Thus, when the door 40 is in the stowed (e.g., closed) position, the inner arcuate panel 70 is substantially flush with the inner panel 60 of the fixed structure 38. The outer arcuate panel 72 is configured to define a respective portion of the outer aerodynamic surface 46 when the door 40 is in its stowed position. Furthermore, when the thrust reverser door 40 is in the stowed position, the outer arcuate panel 72 is configured to circumferentially and axially overlap a portion of the fixed structure 38.

The thrust reverser door 40 is pivotally attached to the fixed structure 38. The thrust reverser door 40 of FIGS. 2 and 3, for example, is attached to the fixed structure 38 by one or more pivot joints 74 (e.g., hinges). These pivot joints 74 are located at the opposing sides 68 of the thrust reverser door 40 at (e.g., on, adjacent or proximate) the second door end 66 and the fixed structure aft end 58. In addition, a first actuator 76 (e.g., a hydraulic, pneumatic or mechanical linear actuator) is configured between and attached to the fixed structure 38 and the thrust reverser door 40. With this configuration, the first actuator 76 is operable to move (e.g., pivot) the thrust reverser door 40 between the stowed position of FIGS. 2 and 4 and the deployed position of FIGS. 3 and 5, where a first thrust reverser passage 78 is opened up between the fixed structure 38 and the door 40.

The (e.g., low) thrust reverser door 42 may be configured as a generally arcuate (e.g., conical) body. The thrust reverser door 42 of FIGS. 2 and 3, for example, extends axially along the centerline 24 between a first (e.g., forward) door end 80 and a second (e.g., aft) door end 82. The thrust reverser door 42 extends circumferentially (e.g., between 150-180 degrees) about the centerline 24 between opposing door sides 84. The thrust reverser door 42 includes and extends radially between an inner arcuate (e.g., conical) panel 86 and an outer arcuate (e.g., conical) panel 88. The inner arcuate panel 86 is configured to define a respective portion of the inner aerodynamic surface 48 and, thus, a respective outer peripheral boundary portion of the gas path 50 when the door 42 is in its stowed position. Thus, when the door 42 is in the stowed (e.g., closed) position, the inner arcuate panel 86 is substantially flush with the inner panel 60 of the fixed structure 38. The outer arcuate panel 88 is configured to define a respective portion of the outer aerodynamic surface 46 when the door 42 is in its stowed position. Furthermore, when the thrust reverser door 42 is in the stowed position, the outer arcuate panel 88 is configured to circumferentially and axially overlap a portion of the fixed structure 38.

The thrust reverser door 42 is pivotally attached to the fixed structure 38. The thrust reverser door 42 of FIGS. 2 and 3, for example, is attached to the fixed structure 38 by one or more pivot joints 90 (e.g., hinges). These pivot joints 90 are located at the opposing sides 84 of the thrust reverser door 42 at (e.g., on, adjacent or proximate) the second door end 82 and the fixed structure aft end 58. In addition, a second actuator 92 (e.g., a hydraulic, pneumatic or mechanical linear actuator) is configured between and attached to the fixed structure 38 and the thrust reverser door 42. With this configuration, the second actuator 92 is operable to move (e.g., pivot) the thrust reverser door 42 between the stowed position of FIGS. 2 and 4 and the deployed position of FIGS. 3 and 5, where a second thrust reverser passage 94 opposite the first thrust reverser passage 78 is opened up between the fixed structure 38 and the door 42.

The trailing edge body 44 is configured to at least partially, here completely, form the nozzle 54 and its annular trailing edge 52. The trailing edge body 44 of FIGS. 2 and 3 extends axially from a first (e.g., forward) body end 96 to a second (e.g., aft) body end 98, which defines the annular trailing edge 52. The trailing edge body 44 extends circumferentially (e.g., completely) about the centerline 24. The trailing edge body 44 extends radially between an inner surface 100 and an outer surface 102. The inner surface 100 forms a respective (e.g., tubular) portion of the inner aerodynamic surface 48 when the thrust reverser doors 40 and 42 are in the stowed positions. The outer surface 102 forms a respective (e.g., tubular) portion of the outer aerodynamic surface 46 when the thrust reverser doors 40 and 42 are in the stowed positions.

Figure 4:
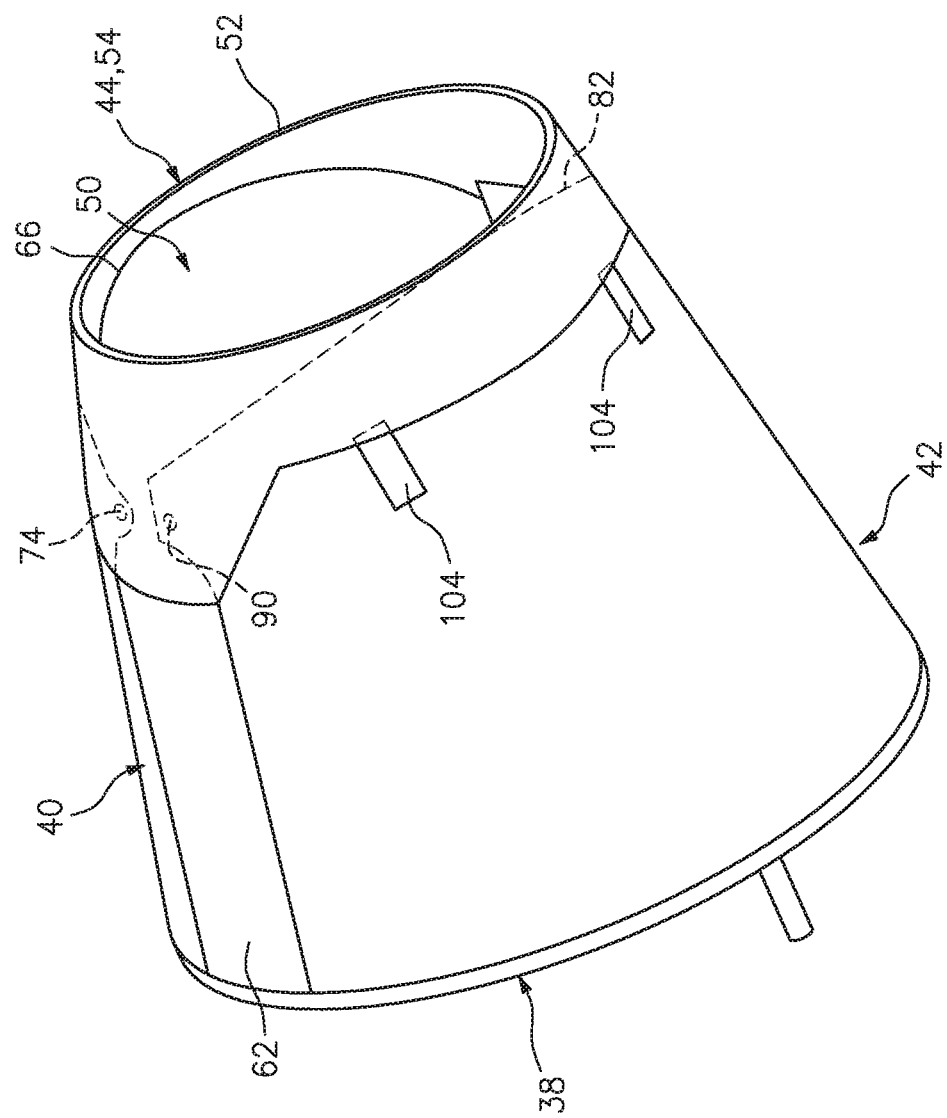
FIG. 4 is another perspective illustration of the aft structure of the aircraft propulsion system of FIG. 2 with the stowed thrust reverser doors, in accordance with various embodiments.
Figure 5:
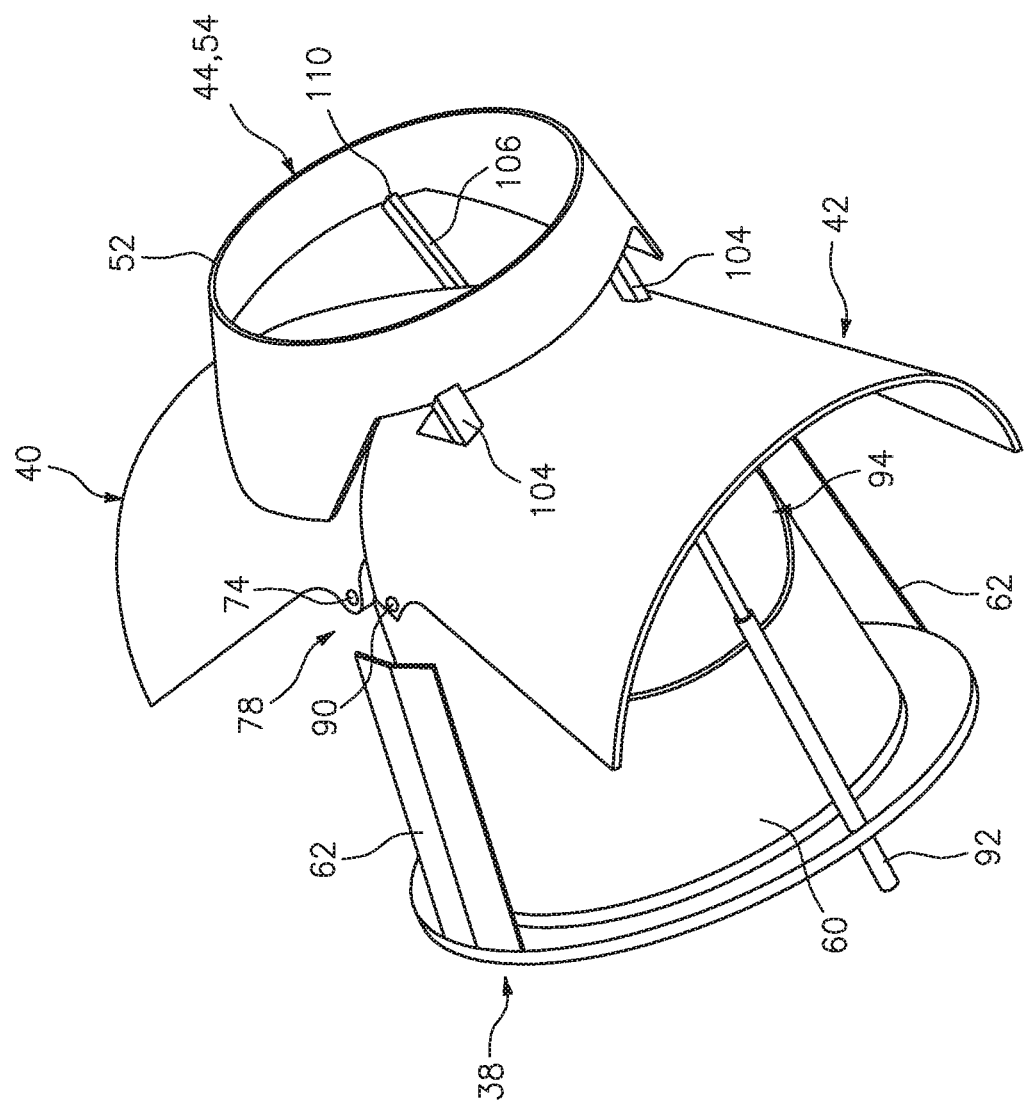
FIG. 5 is another perspective illustration of the aft structure of the aircraft propulsion system of FIG. 3 with the deployed thrust reverser doors, in accordance with various embodiments.

Referring to FIGS. 4 and 5, the trailing edge body 44 is pivotally attached to the thrust reverser door 42 by one or more pivot joints 104; e.g., hinges. These pivot joints 104 are circumferentially spaced from one another. The pivot joints 104 are located proximate the second door end 82.

Referring to FIGS. 2 and 3, the trailing edge body 44 is coupled to the thrust reverser door 40 by one or more linkages 106; e.g., single, unitary link arms. The linkages 106 of FIGS. 3 and 5 are circumferentially displaced from one another about the centerline 24. Each linkage 106 extends between a first (e.g., forward) link arm end 108 and a second (e.g., aft) link arm end 110. Each linkage 106 is pivotally attached to the thrust reverser door 40 at the first link arm end 108. Each linkage 106 is pivotally attached to the trailing edge body 44 at the second link arm end 110.

When in the stowed position, the trailing edge body 44 is configured to cover/overlap at least an aft portion of each thrust reverser door 40, 42.

Figure 6A:
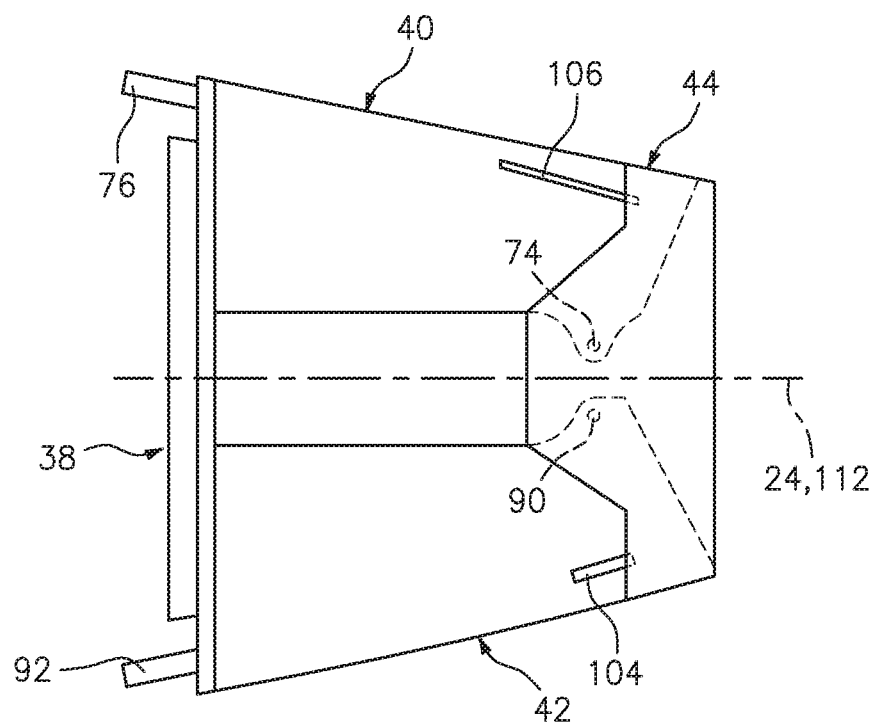
FIGS. 6A-6F illustrate a sequence of the thrust reverser doors moving from stowed positions to deployed positions.
Figure 6B:
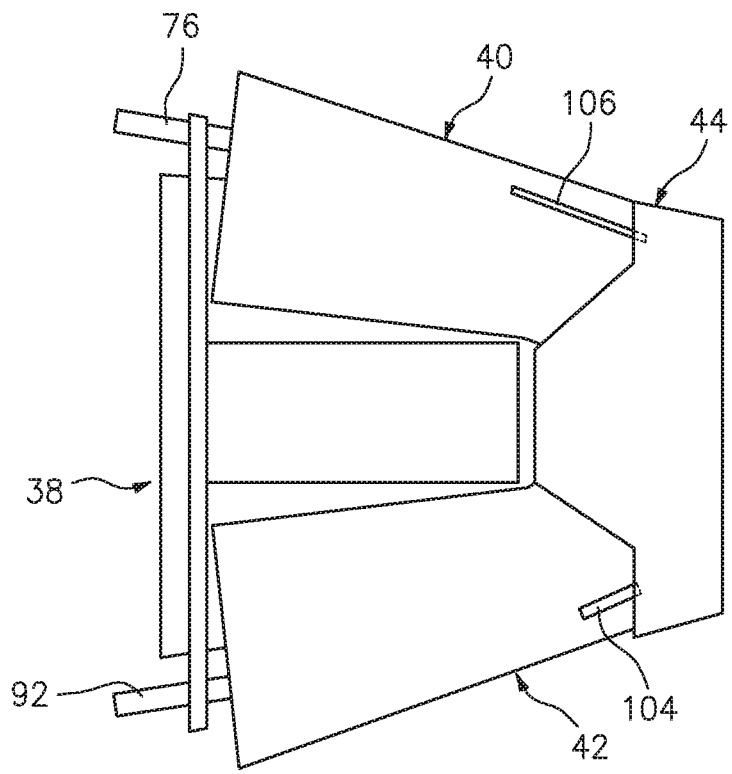
Figure 6C:
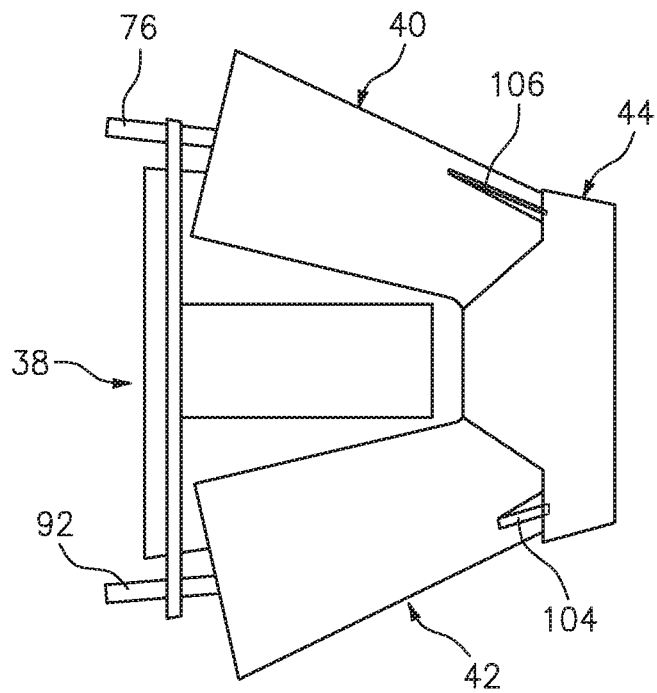
Figure 6D:
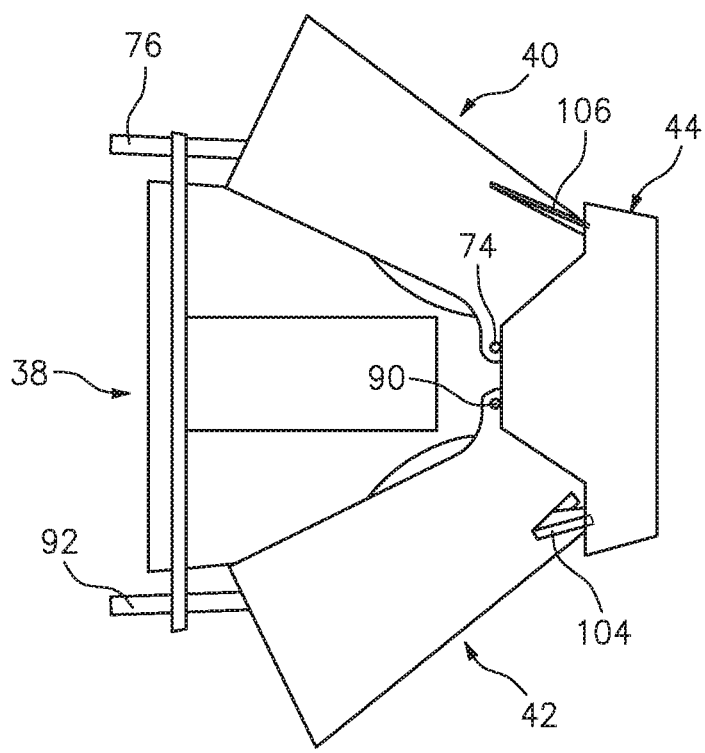
Figure 6E:
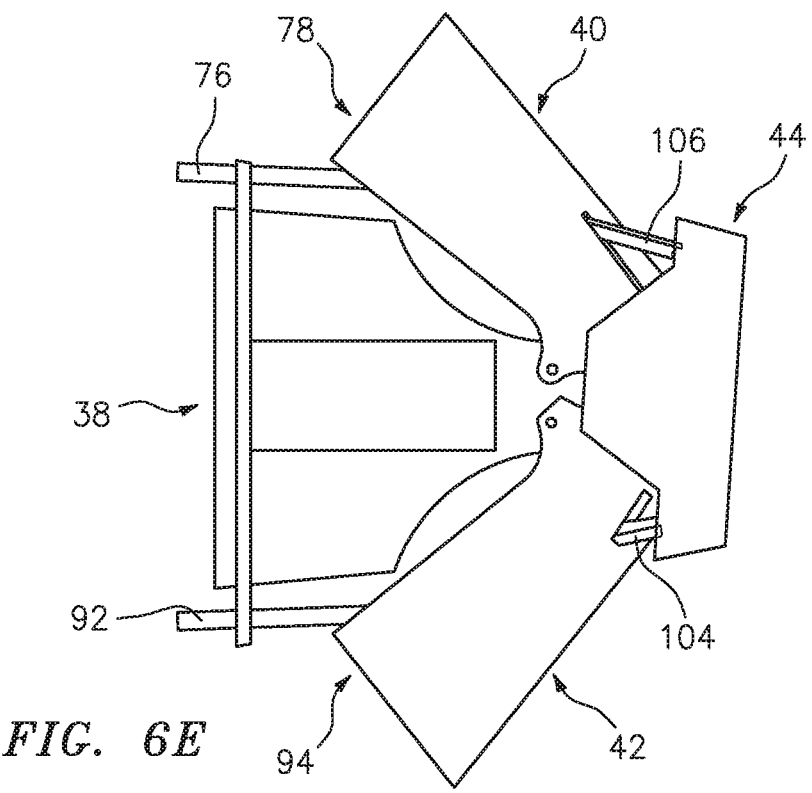
Figure 6F:
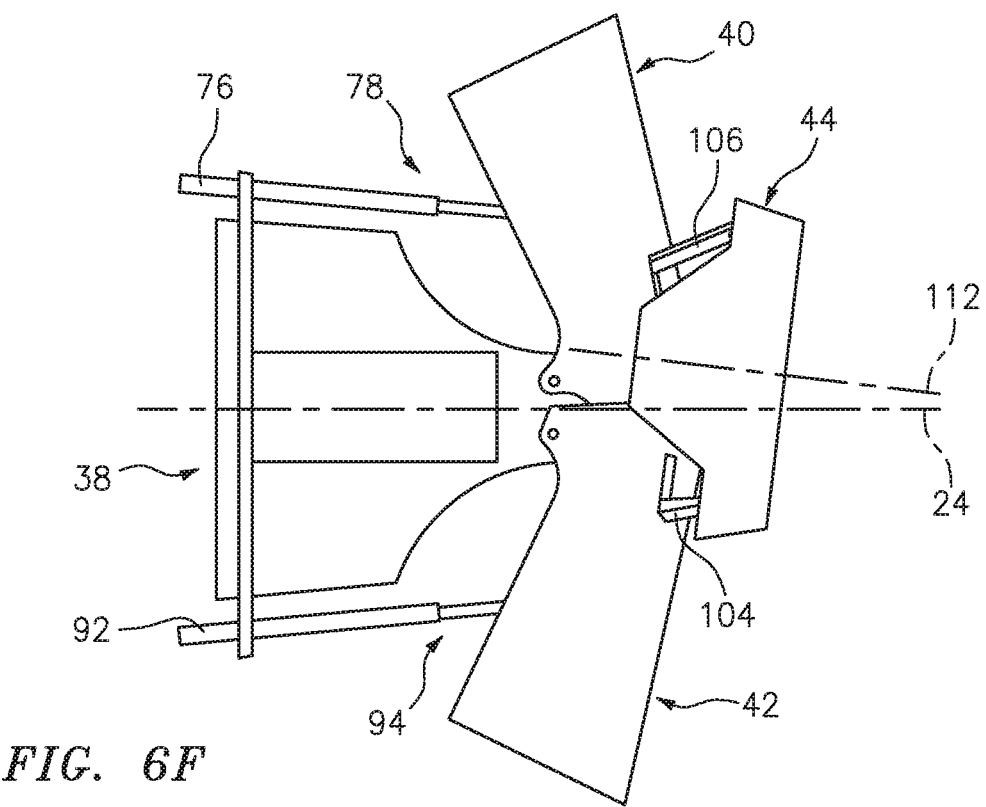

FIGS. 6A-6F illustrate a sequence of the thrust reverser 36 deploying, where the thrust reverser doors 40 and 42 and the trailing edge body 44 are stowed in FIG. 6A and the thrust reverser doors 40 and 42 and the trailing edge body 44 are deployed in FIG. 6F. During deploying, the first and the second actuators 76 and 92 respectively push against the thrust reverser doors 40 and 42 causing the doors 40 and 42 to pivot about the pivot joints 74 and 90. As the thrust reverser doors 40 and 42 pivot, a forward portion of each door 40, 42 projects radially outward into the surrounding environment and an aft portion of each door 40, 42 projects radially inward into the gas path 50. The aft portions of the doors 40, 42 are thereby operable to at least partially close off the gas path 50 proximate the nozzle 54, and redirect the gas flowing axially aft through the gas path 50 radially outward and forward through the thrust reverser passages 78 and 94.

To enable the pivoting of the thrust reverser doors 40 and 42 as shown in FIGS. 6A-6F, the trailing edge body 44 is displaced from a first position (when stowed; see FIG. 6A) to a second position (when deployed; see FIG. 6F). The displacement during the motion of FIGS. 6A-6F includes an axial component, a radial component as well as a pivotal component. More particularly, as the thrust reverser doors 40 and 42 open to the deployed position, the trailing edge body 44 is axially displaced aft, radially displaced along an upward (relative to position in figures) trajectory, and also pivoted in a clockwise direction. Note, the motion of the trailing edge body 44 is not limited to upward or clockwise movement as this relative movement will change depending upon the specific gravitational orientation of the doors 40 and 42 on the nacelle 22 and perspective of an observer.

When the trailing edge body 44 is in the first position (i.e., when the doors 40 and 42 are stowed; see FIG. 6A), an axial centerline 112 of the body 44 may be coaxial with the axial centerline 24. By contrast, when the trailing edge body 44 is in the second position (i.e., when the doors 40 and 42 are deployed; see FIG. 6F), the axial centerline 112 of the body 44 may be non-coaxial with the axial centerline 24. At the second position, for example, the axial centerline 112 may be displaced and/or angled relative to the axial centerline 24. Such displacement may enable the thrust reverser 36 as well as the nacelle 22 as a whole to be shorter than known prior art thrust reversers and nacelles. Of course, in other embodiments, the thrust reverser 36 may be configured such that the axial centerline 112 is displaced form, but not angle relative to (i.e., parallel to), the axial centerline 24 at the second position.

Figure 7:
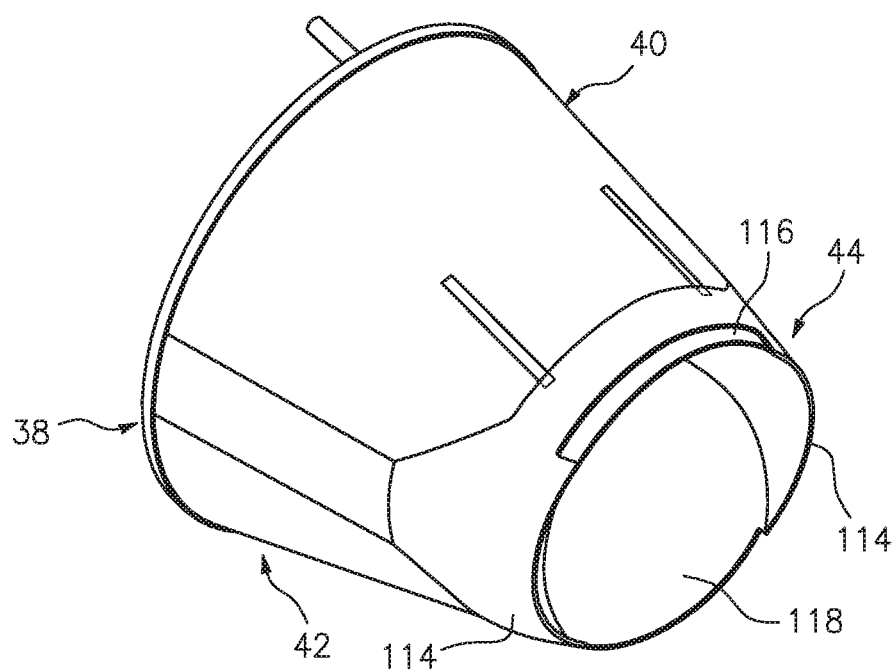
FIG. 7 is a perspective illustration of another aft structure for the aircraft propulsion system with stowed thrust reverser doors, in accordance with various embodiments.
Figure 8:
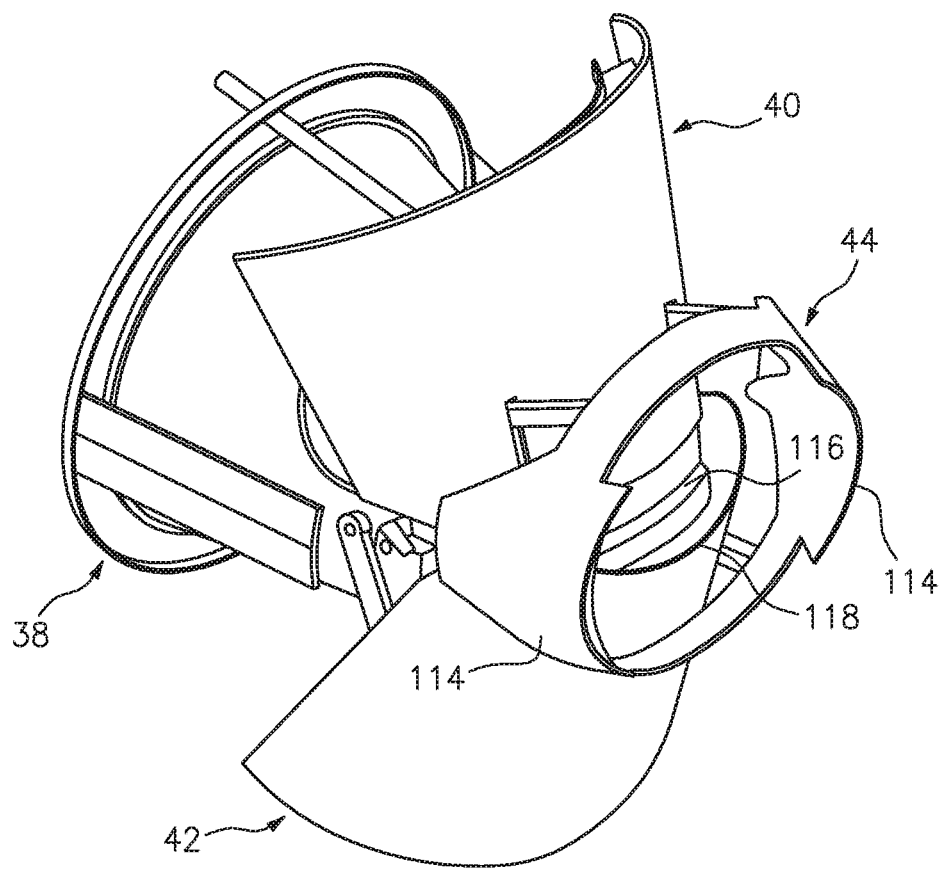
FIG. 8 is a perspective illustration of the aft structure of FIG. 7 with deployed thrust reverser doors, in accordance with various embodiments.
Figure 9:
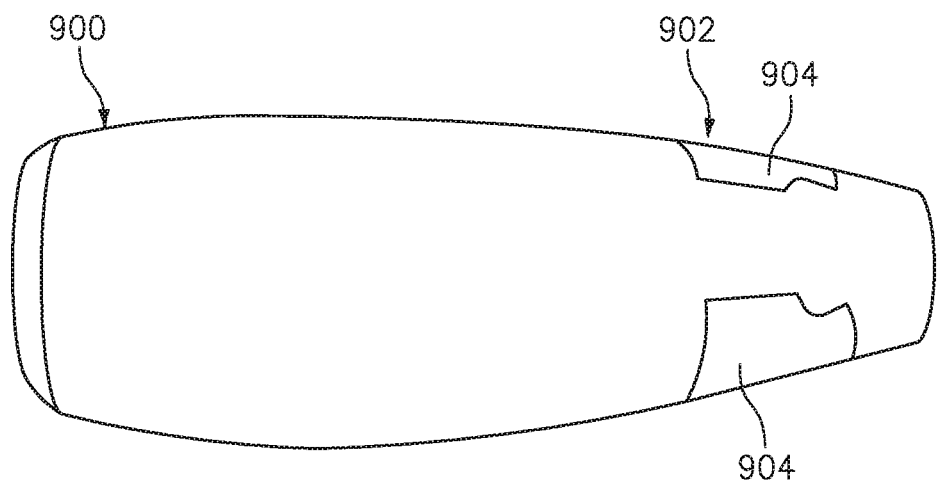
FIG. 9 is a side illustration of a prior art aircraft propulsion system with stowed thrust reverser doors.
Figure 10:
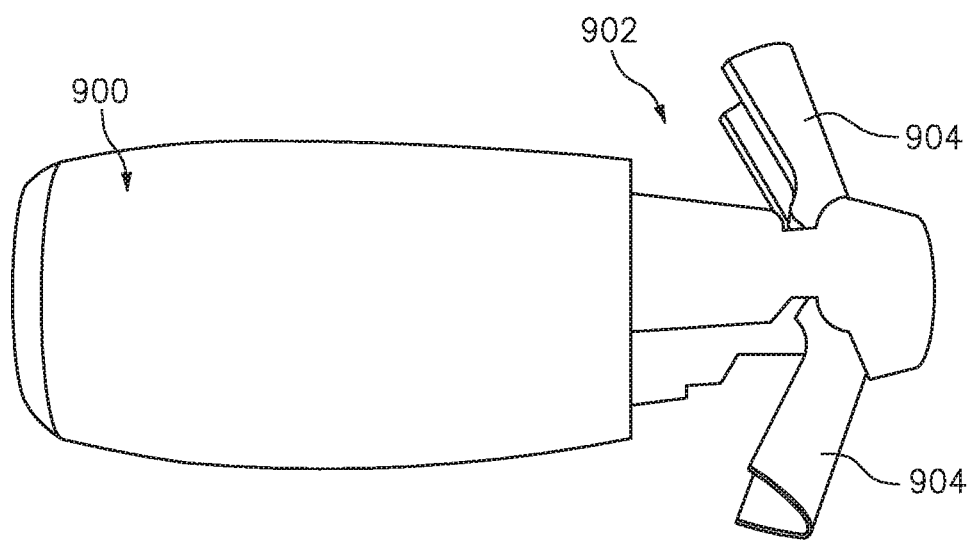
FIG. 10 is a side illustration of the prior art aircraft propulsion system with deployed thrust reverser doors.

In some embodiments, referring to FIGS. 7 and 8, the trailing edge body 44 may be configured to form one or more respective circumferential portions 114 of the nozzle 54 and its annular trailing edge 52. In such embodiments, aft portions of the thrust reverser doors 40 and 42 may be configured to form one or more other circumferential portion 116, 118 of the nozzle 54 and its annular trailing edge 52.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
    a target-type thrust reverser comprising a plurality of thrust reverser doors, each of the thrust reverser doors configured to pivot between a stowed position to a deployed position; and
    a tubular trailing edge body configured to at least partially form a gas path nozzle for the aircraft propulsion system, the tubular trailing edge body forming an annular shape, an entirety of the tubular trailing edge body configured to be displaced when the thrust reverser doors pivot from the stowed position to the deployed position, the tubular trailing edge body maintaining the annular shape as the tubular trailing edge body is displaced, and the displacement of the tubular trailing edge body comprising a radial displacement relative to an axial centerline of the aircraft propulsion system.

2. The assembly of claim 1, wherein the displacement of the tubular trailing edge body comprises an axial displacement relative to the axial centerline of the aircraft propulsion system.

3. The assembly of claim 1, wherein the tubular trailing edge body is configured to completely form a trailing edge of the gas path nozzle.

4. The assembly of claim 1, wherein
    the tubular trailing edge body is configured to form a first portion of a trailing edge of the gas path nozzle; and
    a first of the thrust reverser doors is configured to form a second portion of the trailing edge.

5. The assembly of claim 1, further comprising:
    a fixed structure;
    wherein each of the thrust reverser doors is pivotally attached to the fixed structure by a respective hinge.

6. The assembly of claim 5, wherein
    the tubular trailing edge body is pivotally attached to a first of the thrust reverser doors by a hinge; and
    the tubular trailing edge body is coupled to a second of the thrust reverser doors by a first linkage.

7. The assembly of claim 6, wherein
    the first linkage is configured as a link arm extending between a first link arm end and a second link arm end;
    the link arm is pivotally attached to the second of the thrust reverser doors at the first link arm end; and
    the link arm is pivotally attached to the tubular trailing edge body at the second link arm end.

8. The assembly of claim 6, wherein the tubular trailing edge body is further coupled to the second of the thrust reverser doors by a second linkage, and the first linkage and the second linkage are circumferentially displaced from one another.

9. The assembly of claim 1, wherein the tubular trailing edge body overlaps respective aft portions of the thrust reverser doors when the thrust reverser doors are in the stowed position.

10. The assembly of claim 1, wherein
    a gas path extends within the aircraft propulsion system to a trailing edge of the gas path nozzle;
    each of the thrust reverser doors is configured to partially form an outer peripheral boundary of the gas path when in the stowed position; and
    the tubular trailing edge body is configured to partially form the outer peripheral boundary of the gas path when the thrust reverser doors are in the stowed position.

11. The assembly of claim 1, wherein the thrust reverser doors are configured to redirect gas flowing out from a core of the aircraft propulsion system.

12. The assembly of claim 1, further comprising a plurality of actuators, each of the actuators configured to pivot a respective one of the thrust reverser doors from the stowed position to the deployed position.

13. An assembly for an aircraft propulsion system, comprising:
    a target-type thrust reverser comprising a plurality of thrust reverser doors, each of the thrust reverser doors configured to pivot between a stowed position to a deployed position; and
    a tubular trailing edge body configured to at least partially form a gas path nozzle for the aircraft propulsion system, the tubular trailing edge body forming an annular shape and configured to be displaced when the thrust reverser doors pivot from the stowed position to the deployed position, the tubular trailing edge body maintaining the annular shape as the tubular trailing edge body is displaced, and the displacement of the tubular trailing edge body comprising a pivotal displacement;
    wherein a centerline of the tubular trailing edge body is non-coaxial with an axial centerline of the aircraft propulsion system when the tubular trailing edge body is displaced.

14. The assembly of claim 13, wherein the displacement of the tubular trailing edge body further comprises
    a radial displacement relative to the axial centerline of the aircraft propulsion system; and
    an axial displacement relative to the axial centerline.

15. The assembly of claim 13, wherein the tubular trailing edge body is configured to completely form a trailing edge of the gas path nozzle.

16. The assembly of claim 13, wherein
    the tubular trailing edge body is pivotally attached to a first of the thrust reverser doors by a hinge; and the tubular trailing edge body is coupled to a second of the thrust reverser doors by a first linkage, the tubular trailing edge body is further coupled to the second of the thrust reverser doors by a second linkage, and the first linkage is circumferentially displaced from the second linkage.

17. An assembly for an aircraft propulsion system, comprising:
a fixed structure extending axially along and circumferentially about an axial centerline;
a first thrust reverser door pivotally attached to the fixed structure by a first hinge;
a second thrust reverser door pivotally attached to the fixed structure by a second hinge;
a trailing edge body configured to at least partially form a gas path nozzle for the aircraft propulsion system, the trailing edge body pivotally attached to the second thrust reverser door by a third hinge, the trailing edge body forming an annular shape, an entirety of the trailing edge body further configured to move relative to the fixed structure as the first blocker door and the second blocker door pivot from a stowed position to a deployed position, the trailing edge body maintaining the annular shape during the movement of the trailing edge body, and the movement of the trailing edge body comprising at least one of pivotal movement, or radial movement relative to the axial centerline; and
a linkage coupling the trailing edge body to the first thrust reverser door, the linkage pivotally attached to the trailing edge body and the first thrust reverser door.

18. The assembly of claim 17, wherein the first thrust reverser door and the second thrust reverser door are configured to redirect gas flowing out from the aircraft propulsion system.

19. The assembly of claim 17, wherein the trailing edge body is configured as a tubular trailing edge body.

20. An assembly for an aircraft propulsion system, comprising:
a target-type thrust reverser comprising a plurality of thrust reverser doors, each of the thrust reverser doors configured to pivot between a stowed position and a deployed position; and
a tubular trailing edge body forming an annular shape and configured to at least partially form a gas path nozzle for the aircraft propulsion system, the tubular trailing edge body configured to move from a first position to a second position as the thrust reverser doors pivot from the stowed position to the deployed position;
wherein a centerline of the tubular trailing edge body is coaxial with an axial centerline of the aircraft propulsion system when the tubular trailing edge body is in the first position; and
wherein the centerline of the tubular trailing edge body is non-coaxial with the axial centerline of the aircraft propulsion system when the tubular trailing edge body is in the second position.

* * * * *